April 25, 1933.  A. HUND  1,905,873
DETECTOR CIRCUIT FOR THREE-ELEMENT GASEOUS DISCHARGE TUBES
Filed Oct. 30, 1931
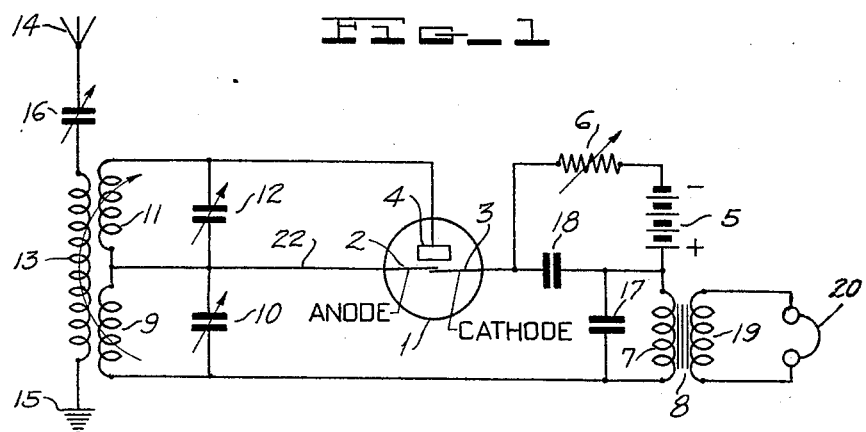
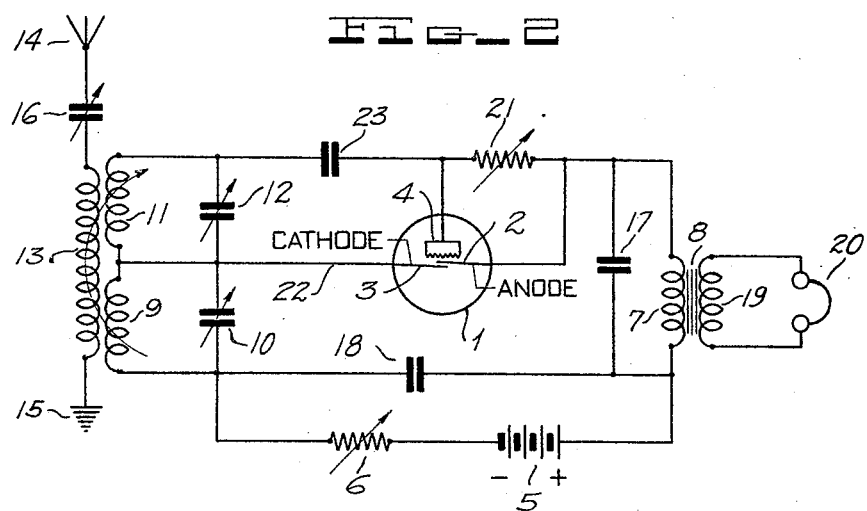
INVENTOR
August Hund
BY
Wm. J. Herdman
ATTORNEY Patented Apr. 25, 1933

1,905,873

UNITED STATES PATENT OFFICE

AUGUST HUND, OF WEST ORANGE, NEW JERSEY, ASSIGNOR TO WIRED RADIO, INC., OF NEW YORK, N. Y., A CORPORATION OF DELAWARE

DETECTOR CIRCUIT FOR THREE-ELEMENT GASEOUS DISCHARGE TUBES

Application filed October 30, 1931. Serial No. 571,989.

This invention relates to radio receiving circuits and more particularly to detectors of that type which employs a three-element gaseous discharge tube for demodulating the received energy.

One of the objects of this invention is to provide a detector employing a gaseous discharge tube having an anode, a cathode, a control electrode and an associated circuit for demodulation of the signaling energy.

A further object is to effect detection of the signaling energy by means of a gaseous discharge tube having an unheated cathode, an anode and a control electrode of suitable formation wherein high frequency currents are caused to be conducted across the gaps between the electrodes by virtue of ionization or a glow discharge therein.

A further object of this invention is to provide a detector circuit suitable for energization from a source of direct current applied between the anode and the cathode respectively of a detector tube and to impress modulated signaling energy upon all of the electrodes of said tube whereby demodulation takes place due to the characteristics of the tube and to the ionization resulting from a flow of direct current across the gap from the anode to the cathode.

These and other desirable objects are attained by the use of a novel detector network in which the gaseous discharge tube is connected to a source of current through a protective resistance, the network also including two resonant circuits upon which modulated signaling energy may be impressed, one of said circuits having a portion in common with an output circuit including a suitable responsive device for the reception of demodulated signaling currents.

In the drawing which accompanies and forms a part of this specification and in which like reference numerals designate corresponding parts throughout:

Fig. 1 is a diagram of one embodiment of my detector network; and

Fig. 2 is a modification thereof.

In one of my copending applications, Serial No. 568,906, filed October 15, 1931, for Space discharge detector circuit, I have disclosed a device for demodulating high frequency signaling currents making use of a two-element space discharge tube. In another of my copending applications, Serial No. 571,500, filed October 28, 1931, for Detector circuit for three-element space discharge tube, I have disclosed a simple circuit for demodulating high frequency signaling currents in which the high frequency energy is impressed upon a control electrode and also upon one of the other electrodes of the tube. The present invention comprehends some of the features disclosed in the copending applications but distinguishes from them in that the high frequency signaling energy is impressed upon three of the electrodes of the gaseous discharge tube and the output circuit of said tube has a portion thereof in common with one of the input circuits.

In carrying out this invention I preferably employ at least two inductances in resonant circuits for the received high frequency energy and these resonant circuits are in coupled relation to the antenna circuit. One branch of the resonant circuit is connected to the control electrode and one other electrode of the tube and the other branch of the resonant circuit is connected across between the anode and the cathode of said tube.

In this invention as well as in those of my copending applications the detector tube operates by virtue of the ionization resulting from a difference of potential across certain electrodes. The tube may be similar with respect to the ionization electrodes to that disclosed in my Patent No. 1,888,556, issued November 22, 1932. The tube has an operating characteristic such as to render it suitable for demodulating high frequency signaling energy. The detection may be either of the form usually understood as "simple detection" or it may be what is known as "power detection".

Referring to the drawing in detail, and particularly to Fig. 1 thereof, there is provided a gaseous discharge tube 1 which comprises an envelope enclosing an anode 2, a cathode 3, and a control electrode 4. Within the envelope is an attenuated atmosphere of any suitable gas. For example, I have found that an inert gas such as helium is quite satisfactory. Electrodes 2 and 3 are connected with an external circuit including a source of energy 5, a protective resistance 6, a primary coil 7 of an audio frequency transformer 8, and a resonant circuit including in parallel an inductance 9 and a tuning condenser 10.

Two input circuits are provided, the first of which comprises an inductance 11 in parallel with a tuning condenser 12 connected on the one side to the anode 2 and on the other side to the control electrode 4. The second input circuit comprises an inductance 9 in parallel with the tuning condenser 10 connected also to the anode 2 by the same conductor 22 which is part of the first mentioned input circuit and on the other side the inductance 9 and condenser 10 are connected to the cathode 3 through by-pass condensers 17 and 18.

The inductances 9 and 11 represent two secondary coils of a high frequency transformer, the primary 13 of which is included in an antenna circuit having an antenna 14, a ground 15, and preferably a small condenser 16.

In order that the high frequency currents induced by the primary coil 13 in the inductance 9 may be suitably conducted across the electrodes 2 and 3 of the tube 1 they are by-passed through the condenser 17 which has a small capacitance such as to offer a high impedance to audio-frequency currents and the condenser 18 which has a large capacitance offering a low impedance to both audible and inaudible frequencies. By tuning both the 9—10 branch and the 11—12 branch to resonance with the carrier frequency of the received signaling energy, a relatively high efficiency of transfer to the tube of the energy absorbed in the antenna circuit is attained.

The secondary 19 of the transformer 8 is in circuit with any suitable responsive device such as the phones 20. Obviously, in place of the phones a loud speaker or other receiving device may be used if preferred or amplification means may be introduced between the detector circuit and a loud speaker.

It will be understood that the high frequency signaling energy absorbed in the antenna circuit is transferred to the resonant circuits 9—10 and 11—12 whence they are impressed upon the electrodes of the tube 1 where they are demodulated and again transferred to the output circuit including the audio-frequency transformer 8 so that the audio frequency signals may be impressed upon the responsive device 20.

In the operation of this circuit both direct current and modulated high frequency signaling currents are impressed upon the anode 2 and cathode 3 of the tube and they are conducted across the gap therebetween. In this respect the circuit functions similarly to that of my detector circuit as disclosed in the copending application, Serial No. 568,906. The high frequency energy is also impressed upon the resonant circuit 11—12, and is caused to vary the potential of the control electrode 4 with respect to the other electrodes. In this manner the characteristics of the tube which are suitable for detecting are exhibited. Proper phasing of the currents in the two input circuits with respect to one another is important. The phasing can, of course, be adjusted in any well-known manner such as by rotatably mounting the coils 9 and 11 independently of one another.

Referring now to Fig. 2, a modification of the detector circuit is shown in which a control electrode leak 21 is connected externally of the tube across the terminals of the control electrode 4 and anode 2. The connections between the resonant circuits 9—10 and 11—12 on the one hand and the electrodes of the tube on the other hand, are quite different from those shown in Fig. 1. In the modification (Fig. 2) the conductor 22 which is common to the two resonant circuits connects with the cathode 3 rather than with the anode as in Fig. 1. With this arrangement it becomes essential to place a small condenser 23 in circuit between the control electrode 4 and the resonant circuit 11—12 otherwise a negative charge would be placed upon the control electrode 4 which would be undesirable. With the arrangement as shown the direct current is substantially confined to the gap between the anode and the cathode and is not permitted to traverse the control electrode other than in the negligible amount conducted through the leak 21.

In other respects the circuit of Fig. 2 will be seen to be similar to that shown in Fig. 1 and the operation of this modification will be readily understood from the foregoing description.

In tests of my invention, according to the modification shown in Fig. 2, I have found that the optimum condition of sensitivity is more or less dependent upon a proper selection of the resistance value for the leak 21.

It is to be understood that in carrying out my invention I am not limited to any particular arrangement of voltage impressed across the electrodes of the tube 1, neither am I limited in any way to the amperage of the currents which may be conducted through the input and output circuits respectively.

When the current density in the output circuit is properly adjusted, it is possible to cause amplification along with detection in the tube 1.

Although I have shown two preferred embodiments of my detector network for demodulating high frequency signaling energy, it will be understood that many changes can be made therein without departing from the spirit and the intended scope of my invention. I do not, therefore, limit myself to the foregoing except in so far as may be determined by the scope of the appended claims.

I claim:

1. A radio frequency detector comprising a gaseous discharge device having an anode, a cold cathode and a control electrode, a tuning device connected to said gaseous discharge device having a high frequency primary inductance and two secondary inductances, said secondary inductances forming respectively branches of two independent resonant circuits, one of which includes the control electrode and one of the other electrodes of said gaseous discharge device and the other of said resonant circuits being in circuit with the anode and cathode of said gaseous discharge device, and means to demodulate signaling energy through the effect of ionization in said device.

2. A radio frequency detector comprising a set of electrodes enveloped in an inert gas as an attenuated pressure suitable for a gaseous discharge between said electrodes, one of said electrodes being a unipotential cathode which is activated solely by virtue of its negative charge with respect to the potential of the other electrodes of the set, a pair of high frequency resonant circuits tunable to a carrier frequency, means for absorbing high frequency signaling energy of said carrier frequency, said means being coupled to said resonant circuits, connections between said resonant circuits and the electrodes of said gaseous discharge device whereby high frequency signaling currents may be communicated to said electrodes in suitable phase relation, means for impressing one potential upon the cathode of said gaseous discharge device and higher potentials upon the other electrodes thereof, and means providing a suitable operating characteristic for said gaseous discharge device whereby ionization therein results in demodulation of the high frequency signaling currents.

3. In a radio frequency detector an antenna circuit, a pair of resonant circuits coupled to said antenna circuit and in suitable phase relation with one another, and tunable to a carrier frequency to which said antenna circuit is responsive, a gaseous discharge tube having an anode, an unheated cathode and a third electrode, said anode and said third electrode being in series with one of said resonant circuits and said anode and cathode being in series with the other of said resonant circuits, an output circuit for demodulated signaling energy from said gaseous discharge tube, said output circuit including said anode and said cathode, a source of potential, a load and means characterizing said gaseous discharge tube so as to cause an impress of demodulation components of said signaling energy upon said output circuit including said load.

4. A radio frequency detector comprising a space discharge tube having a plurality of electrodes one of which is an anode, another of which is an unheated cathode and a third of which is a control electrode, a plurality of resonant input circuits having a common connection with one of said electrodes, said input circuits being also connected the one to said control electrode and the other to a third electrode of said space discharge tube, means to effect ionization between said electrodes by virtue of which demodulation of signaling energy impressed upon said input circuit takes place and means comprising an output circuit and a device responsive to the demodulated audio frequency components of said signaling energy.

5. A radio frequency detector comprising a space discharge tube having a plurality of electrodes one of which is an anode, another of which is an unheated cathode, and a third of which is a control electrode, an input circuit including said cathode and said control electrode, a second input circuit including said cathode and said anode, an output circuit, means for effecting ionization between said electrodes by virtue of which demodulation of signaling energy impressed upon said input circuit takes place so that the demodulated audio frequency components thereof are transferred to said output circuit, and means responsive to the demodulated signaling energy transmitted through said output circuit.

6. A radio frequency detector network comprising means including a plurality of input circuits tunable to resonance with the carrier frequency of radiated signaling energy to which said network may be made responsive, a three-electrode gaseous discharge tube having two of its electrodes in series with one of said input circuits and a third electrode thereof together with one of the other electrodes in series with the other of said input circuits, a source of direct current for exciting said tube to cause ionization therein, means to impress a difference of potential across two of the electrodes of said tube from said source of direct current, a high resistance for limiting the flow of direct current, means shunting said source and high resistance whereby audio frequency currents may be by passed and a responsive device in series with said source of direct current for receiving the demodulated output energy of said tube.

7. A radio frequency detector circuit comprising means for absorbing radiated signaling energy, a pair of resonant circuits, each coupled in suitable phase relation to said absorption means and including an inductance in parallel with a variable condenser, a space discharge tube having three electrodes two of which are in series with one of said resonant circuits and a third of which together with one of the first two electrodes is in series with the other of said resonant circuits, a source of direct current energy for impressing a difference of potential across two of the electrodes of said space discharge tube and for effecting ionization therebetween, a protective resistance in series with said source of energy and said space discharge tube, a by-pass condenser shunting said source of energy and said resistance and offering a relatively low impedance to audio frequency currents, a load circuit for said audio frequency currents in series with said by-pass condenser and said space discharge tube and means characterizing said space discharge tube so as to demodulate the high frequency signaling energy whereby audio frequency currents are impressed upon said load circuit.

8. A radio frequency detector network comprising a space discharge tube having an anode, an unheated cathode, and a control electrode, a source of direct current for supplying positive potential to said anode and negative potential to said cathode, a high resistance connecting externally of said tube between the anode and control electrode thereof, a pair of resonant circuits responsive to high frequency signaling energy, each being in series with the cathode and one or the other of the other electrodes respectively thereof, a high resistance in series with said source and shunted by a condenser, said condenser offering a low impedance to audio frequency currents, an audio frequency transformer in series with said source and said tube and a responsive device energized by demodulated signaling currents induced in the secondary of said transformer.

9. Apparatus for demodulating radio signaling energy comprising a pair of tunable circuits, a three-electrode gaseous discharge tube two electrodes of which are included in one of said tunable circuits and one of the same electrodes together with a third electrode being in circuit with the other of said tunable circuits at the same time being in series with a source of direct current; means including said source of direct current for effecting a glow discharge in said tube, means providing a curved characteristic for said tube whereby ionization therein results in demodulating said signaling energy, a responsive device in series with said source of direct current and said tube and means for transferring the demodulated components of said signaling energy to said responsive device.

AUGUST HUND.